United States Patent Office 3,350,469
Patented Oct. 31, 1967

3,350,469
METHOD FOR THE PRODUCTION OF PARAXYLENE
Patrick W. Ryan, Chicago Heights, Ill., assignor to Sinclair Research Inc., New York, N.Y., a corporation of Delaware
No Drawing. Filed Aug. 19, 1964, Ser. No. 390,722
4 Claims. (Cl. 260—672)

This invention relates to the production of xylene containing more than the equilibrium amount of p-xylene by transalkylation of toluene with higher methylated aromatics using a solid, silica-based hydrocarbon cracking catalyst.

Commercial production of p-xylene involves the recovery of p-xylene from refinery streams via crystallization techniques. Presently this crystallization procedure is carried out in two stages with a xylene feed which has the approximate composition 5.5% o-xylene, 49% m-xylene, 19% p-xylene, and 26% ethylbenzene. The overall recovery of 99.4% pure p-xylene based on the starting xylene stream runs about 55–60%. The recovery of p-xylene can be greatly improved and the cost reduced if the concentration of p-xylene in the crystallizer feed can be increased sufficiently.

It is well known that methylated aromatics in the presence of certain catalysts undergo transalkylation and disproportionation reactions. U.S. Patent No. 2,396,965 to Passino discloses the production of toluene by the reaction of benzene and xylene in the presence of a hydrogen fluoride catalyst. In U.S. Patent No. 2,954,414 to Hoff et al. the production of xylene by reacting toluene and a polymethylbenzene containing 4 to 6 methyl groups in the presence of a hydrogen fluoride catalyst is disclosed. U.S. Patent No. 2,589,057 to Corson et al. describes the production of ethyl benzene by reacting benzene and diethylbenzene in the presence of a catalytic amount of a silica-alumina catalyst.

The object of this invention is to provide a method of converting toluene to xylene containing a substantial or predominant amount of p-xylene using a polymethylbenzene as a methylating agent, and yet avoid a liquid phase reaction system, handling problems and corrosion problems associated with a hydrogen fluoride catalyst. It has been found that toluene can be converted to xylene, for instance, containing more than the thermodynamic equilibrium amount of p-xylene, by transmethylating toluene by use of a tetramethyl or higher substituted methyl benzene in the presence of a solid silica-based hydrocarbon cracking catalyst at a temperature from about 500–700° F. As a result of this discovery, high recoveries of p-xylene from the product stream by crystallization are possible.

The feedstocks for this reaction consist essentially of toluene and tetramethyl or higher substituted methyl benzene, e.g. pentamethyl and hexamethyl benzenes. The higher methyl substituted benzenes are preferred since increased quantities of xylenes can be produced via secondary reactions. The main reaction which occurs with the higher substituted benzenes, e.g. pentamethyl benzene, is illustrated below.

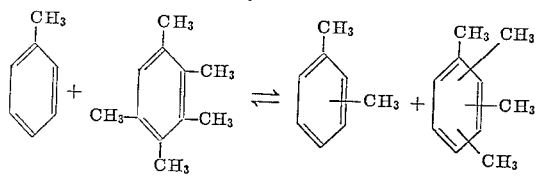

Whereas the transalkylation of toluene with isodurene affords $C_8$ and $C_9$ methylbenzenes, the transalkylation of toluene and pentamethylbenzene should ideally give $C_8$ and $C_{10}$ products. These initial products are susceptible to secondary reactions, which are manifested to a varying degree depending on the toluene/pentamethylbenzene ratio in the feed and the reaction conditions.

SECONDARY REACTIONS

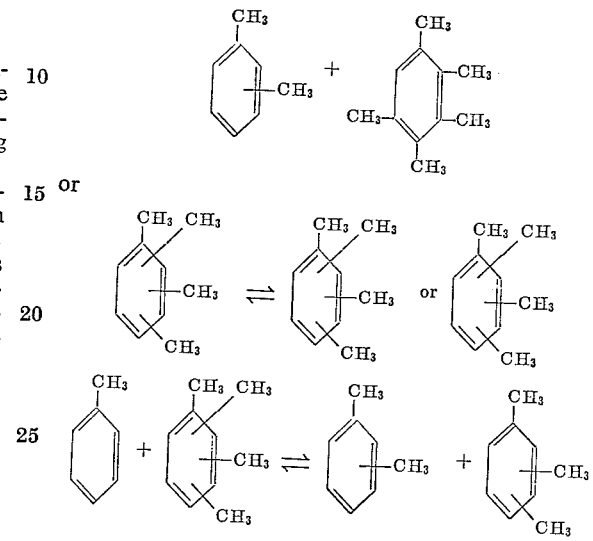

That these secondary reactions occur is shown by the fact that $C_9$ alkyaromatics are present in the products from these feedstocks. The amount of $C_9$ present relative to the amount of $C_8$ formed provides a measure of the amount of secondary reactions which have taken place.

In addition to the toluene and polymethylbenzenes containing from 4 to 6 methyl groups the feed may contain hydrocarbons which do not react deleteriously in the presence of the solid silica-based hydrocarbon cracking catalyst under the conditions of this invention. It is preferred that ethylated aromatics are not a major portion of the feed since they can enter into the transalkylation reaction with toluene to produce ethylated toluene.

The mole ratio of toluene to the polymethylated benzene of 4 to 6 methyl groups should be in the range of about 1–10 for best results and the preferred ratio is from about 2 to 5. By maintaining an excess of toluene, xylene formation rather than the secondary reactions is favored. The normal temperature range for this reaction is from about 500 to 700° F., with the preferred temperature being from about 575 to 625° C. Under many conditions, the preferred temperature may be about 600° F. and substantially lower temperatures may make the use of lower space velocities advisable. Atmospheric pressure is preferred although somewhat higher or lower pressures may be used satisfactorily.

The transalkylation reaction is carried out in the vapor phase over the solid catalyst. Any suitable reactor system for contacting the vapor and catalyst may be employed. For example, the vapor may flow through a stationary catalyst bed. On the other hand, a moving catalyst bed reactor has been used successfully for this reaction. If desired the catalyst may be finely divided and employed as a fluidized catalyst bed.

The space velocity is dependent upon many variables such as temperature, feed, desired conversion, etc. Often however, the WHSV (weight hourly space velocity) will be from about 0.1 to 10 lbs. hydrocarbon per hour per pound of catalyst. The preferred WHSV range is from about 0.3 to 2.0. The optimum space velocity may be dependent upon the particular temperature. Also, by proper selection of space velocity in a specific situation the conversion of toluene and pentamethylbenzene to xylene may be controlled to avoid undue isomerization of initially formed products.

Catalysts which can be employed in accordance with the present invention include solid silica-based hydrocarbon cracking catalysts. Advantageously, calcined silica-containing catalysts, for instance, those containing a major proportion, at least about 50%, of silica and minor amounts of solid acidic metal or non-metal oxides, may be employed.

Silica-alumina catalysts represent the preferred class of acidic catalysts because of their low cost, regenerability, high rate of conversion obtained and their stability at the operating conditions employed. The synthetic gel-type of silica-alumina catalyst, such as the co-precipitated silica-alumina and the alumina precipitated on silica type may be used. Popular synthetic gel catalysts generally contain about 10 to 30% alumina, for instance about 12% alumina. The catalyst is supplied, preferably, in the form of spheroidal bead-like particles, which form is ideally suited to the continuous flow of a moving bed system. Advantageously, Socony "Durabead" catalysts having a catalytic activity of about 38 may be used. Such catalysts, preferably are supplied as macrosize particles having a surface area of about 10 to 300 m.$^2$/g., preferably from about 100 to 200 m.$^2$/g., and average pore radii of about 20 to 70 A. in order to minimize pore diffusional effects which lower the ultimate selectivity of the isomerization reaction products. The macrosize catalyst particles usually have diameters in the range of about $\frac{1}{16}$ to $\frac{3}{8}$ inch.

The reaction of this invention and the results obtained therefrom can be more fully described by reference to the following examples.

Examples

A feed stream containing toluene and higher methylated aromatics was contacted in concurrent flow with a silica-alumina catalyst (38 Activity Index (CAT A) Socony "Durabead") in a 1 inch I.D. moving bed reactor. Feed composition, reactor conditions and product compositions are given in the table below.

In Run 1 which was carried out at 603° F. and 1 WHSV a 28% yield of xylenes was realized with a selectivity of 74%. A decrease in WHSV to 0.347 at 602° F. (Run 2) gave an increase in yield to 55% at a selectivity of 90%. In each of the above products, analysis of the xylene fraction showed p-xylene to be the predominant isomer. Concentrations for p-xylene of the resultant xylene stream ranged from 46–56%, for m-xylene 26–36% and for o-xylene 17–18%. The thermodynamic distribution of xylene isomers at this temperature would be 24.2% para, 54.2% meta and 21.6% ortho [C. J. Egan, J. Chem. & Eng. Data, 5# 3, 248 (1960)].

Run 3 was carried out with a feed in which toluene to pentamethylbenzene mole ratio was approximately 5. Under these conditions a 107% yield of xylene was obtained with a selectivity of 162%. The conversion level was 66%. The very high yield and selectivity values obtained may be explained by a combination of main reaction I and secondary reaction III. These results show that the use of pentamethylbenzene over a tetramethylbenzene in this transalkylation reaction can provide higher yields, conversions, and selectivities to xylene if the secondary reactions are controlled. This is illustrated further in Run 5.

Run 4 provides an example wherein the reaction product is seen as a result of main reaction I and secondary reaction II. In this run a feed with a mole ratio of toluene to pentamethylbenzene of 2 was used. From the results it is seen that less xylene and more $C_9$ aromatics were formed than in the case when a 5/1 feed was utilized. Thus, as the concentration of alkylating agent is increased in the feed the chance for further alkylation of the initially formed xylene is also increased. This results in lower yields and selectivities because of an increase in side reaction II.

As shown in Run 5, increased yields and a slight increase in selectivity can be achieved at 0.3 WHSV using a 2/1 mole ratio of toluene to pentamethylbenzene. This is similar to the results with the isodurene feedstock. With regard to the isomer distribution in the xylene stream produced, p-xylene again was the predominant isomer. Its concentration ranged from 51 to 64% while m-xylene ranged from 29 to 35% and o-xylene from 6 to 14%.

TRANSALKYLATION RESULTS

| | Run 1 | Run 2 | Run 3 | Run 4 | Run 5 |
|---|---|---|---|---|---|
| Feed | [1] $C_7$–$C_{10}$ | [2] $C_7$–$C_{10}$ | [3] $C_7$–$C_{11}$ | [4] $C_7$–$C_{11}$ | [4] $C_7$–$C_{11}$ |
| Temp., °F | 603 | 602 | 602 | 603 | 600 |
| WHSV | 1.01 | .347 | .992 | 1.01 | .302 |
| Products Liq. HC | 94/97=97% | 41/43.8=94% | 45/47.8=95% | 91.5/97=94% | 13.5/14.5=93% |
| Gas, l./hr | 0.68 | 0.77 | 0.58 | 1.15 | 0.47 |
| Percent Coke on Cat | 0.18 | 0.1 | 0.33 | 0.28 | 0.64 |
| Product Distribution (area percent by VPC): | | | | | |
| Benzene | 0.2 | 0.4 | 0.2 | 0.1 | 0.4 |
| Toluene | 51.5 | 41.6 | 62.5 | 43.3 | 37.7 |
| p-Xylene | 4.2 | 8.0 | 10.5 | 6.4 | 10.6 |
| m-Xylene | 2.9 | 6.3 | 5.0 | 3.1 | 7.5 |
| o-Xylene | 1.5 | 3.0 | 1.0 | 1.3 | 2.9 |
| Ethyltoluene | T | 0.2 | | | 5.6 |
| 1,3,5-TMB | 2.6 | 5.5 | 0.6 | 1.5 | 17.0 |
| 1,2,4-TMB | 9.2 | 16.3 | 2.7 | 6.7 | 2.0 |
| 1,2,3-TMB | 1.8 | 2.3 | 0.5 | 0.9 | |
| Ethylxylenes | 0.1 | 0.1 | | | |
| Durene | | 13.9 | 8.1 | 19.3 | 13.5 |
| Isodurene | 21.8 | | 1.4 | 3.1 | 1.3 |
| Prehnitene | 2.2 | 1.4 | | | |
| O-$C_{11}$ | T | 0.1 | | | |
| Pentamethyl-benzene | 1.8 | 0.9 | 7.4 | 13.8 | 1.5 |
| Hexamethyl-benzene | | | 0.1 | 1.4 | |
| Xylene Yield [5] (percent) | 28 | 55 | 107 | 36 | 69 |
| Paraxylene Yield (percent) | 14 | 25 | 68 | 31 | 35 |
| Conversion [5] (percent) | 38 | 61 | 66 | 67 | 97 |
| Selectivity [6] (percent) | 74 | 90 | 162 | 54 | 71 |

[1] 61% $C_7$–39% $C_{10}$ (isodurene) by weight.
[2] 59.7% $C_7$–40.3% $C_{10}$ (isodurene) by weight.
[3] 77.9% $C_7$–0.4% $C_{10}$ (isodurene)–21.7% $C_{11}$ (pentamethyl-benzene) by weight.
[4] 58.5% $C_7$–41.5% $C_{11}$ (pentamethylbenzene) by weight.
[5] Based on higher methylated aromatic.
[6] To xylenes.

In Runs 1 and 2 the amounts of benzene and pentamethylbenzene formed were small indicating that the extent of self-disproportionation was low and that the main reaction was transalkylation between toluene and isodurene.

What is claimed is:

1. A process for the production of xylene containing more than the thermodynamic equilibrium amount of p-xylene consisting essentially of contacting in the vapor phase a feed consisting essentially of toluene and polymethylbenzene containing from 4 to 6 methyl groups with a solid silica-based hydrocarbon cracking catalyst at a temperature of about 500 to 700° F. wherein the mole ratio of toluene to the polymethylbenzene is from about 1 to 10.

2. The process of claim 1 wherein said catalyst is a silica-alumina catalyst.

3. The process of claim 2 wherein the mole ratio of toluene to the polymethylbenzene is from about 1 to 10.

4. The process of claim 3 wherein the catalyst contains from about 10 to 30 percent alumina.

References Cited

UNITED STATES PATENTS

| | | | |
|---|---|---|---|
| 2,756,261 | 7/1956 | Fetterly | 260—668 |
| 2,954,414 | 9/1960 | Hoff et al. | 260—672 X |
| 3,116,340 | 12/1963 | Burk et al. | 260—672 X |
| 3,211,798 | 10/1965 | Burk et al. | 260—672 X |

DELBERT E. GANTZ, *Primary Examiner.*

C. R. DAVIS, *Assistant Examiner.*

UNITED STATES PATENT OFFICE
CERTIFICATE OF CORRECTION

Patent No. 3,350,469　　　　　　　　　　　　October 31, 1967

Patrick W. Ryan

It is hereby certified that error appears in the above numbered patent requiring correction and that the said Letters Patent should read as corrected below.

Column 2, lines 15 to 22, the second formula should appear as shown below instead of as in the patent:

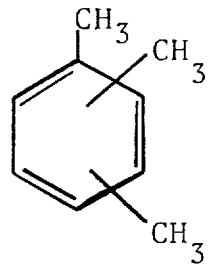

columns 3 and 4, in the table, in all of the runs 1 through 5, the amounts of "Durene" and "Isodurene" were recorded as a sum in each instance and should be indicated by brackets.

Signed and sealed this 18th day of March 1969.

(SEAL)
Attest:

EDWARD M. FLETCHER, JR.　　　　　　　EDWARD J. BRENNER
Attesting Officer　　　　　　　　　　Commissioner of Patents